United States Patent
Schrader et al.

[11] 3,862,268
[45] Jan. 21, 1975

[54] O-ALKYL-S-(CARBAMOYLOXY-METHYL)-(THIONO) THIOLPHOSPHORIC (PHOSPHONIC) ACID ESTERS

[75] Inventors: Gerhard Schrader, Wuppertal; Ingeborg Hammann, Cologne, both of Germany

[73] Assignee: Bayer Aktiengesellschaft, Leverkusen, Germany

[22] Filed: Feb. 7, 1973

[21] Appl. No.: 330,539

[30] Foreign Application Priority Data
Feb. 11, 1972 Germany............................ 2206678

[52] U.S. Cl................... 260/938, 260/979, 424/211
[51] Int. Cl............................. A01n 9/36, C07f 9/16
[58] Field of Search.................................... 260/938

[56] References Cited
UNITED STATES PATENTS
2,998,347   8/1961   Fancher et al.................. 260/938 X
3,073,858   1/1963   Szabo et al. ........................ 260/938

Primary Examiner—Lorraine A. Weinberger
Assistant Examiner—Richard L. Raymond
Attorney, Agent, or Firm—Burgess, Dinklage & Sprung

[57] ABSTRACT

O-Alkyl-S-[carbamoyloxy-methyl]- (thiono) thiolphosphoric (phosphonic) acid esters of the formula

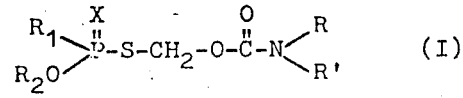

in which
$R_1$ is lower alkyl, lower alkoxy or phenyl,
$R_2$ is lower alkyl,
R is hydrogen, alkyl or phenyl,
R' is hydrogen or alkyl with 1 to 3 carbon atoms, and
X is oxygen or sulfur,
which possess insecticidal and acaricidal properties.

7 Claims, No Drawings

O-ALKYL-S-(CARBAMOYLOXY-METHYL)-(THIONO) THIOLPHOSPHORIC (PHOSPHONIC) ACID ESTERS

The present invention relates to and has for its objects the provision of particular new O-alkyl- S-[carbamoyloxy-methyl]- (thiono) thiolphosphoric (phosphonic) acid esters, which possess insecticidal and acaricidal properties, active compositions in the form of mixtures of such compounds with solid and liquid dispersible carrier vehicles and methods for producing such compounds and for using such compounds in a new way especially for combating pests, e.g., insects and acarids, with other and further objects becoming apparent from a study of the within specification and accompanying examples.

It is known from German Published Spec. DAS No. 1,060,659 and French Pat. Spec. No. 1,206,931 that O,O-dialkyl-S-[N-monoalkylcarbamoylmethyl]-(thiono)thiolphosphoric acid esters, for example O,O-diethyl-S-[N-monomethyl-carbamoylmethyl]-(Compound A) or ),)-diethyl-S-[N-methyl-ethoxycarbonyl-carbamoylmethyl]-thionothiolphosphoric acid ester (Compound B, possess an insecticidal and acaricidal action possess an insecticidal and acaricidal action.

The present invention provides O-alkyl-S-[carbamoyloxymethyl]-(thiono)thiolphosphoric(phosphonic) acid esters of the general formula

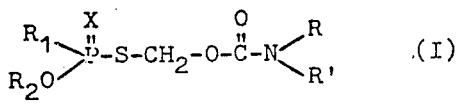

in which
R$_1$ is lower alkyl, lower alkoxy or phenyl,
R$_2$ is lower alkyl,
R is hydrogen, alkyl or phenyl,
R' is hydrogen or alkyl with 1 to 3 carbon atoms, and
X is oxygen or sulfur.

Preferably, R$_1$ and R$_2$ are straight-chain or branched alkyl or R$_1$ is alkoxy with 1 to 3 carbon atoms, for example methyl, ethyl and n- or iso-propyl and their alkoxy counterparts; R is hydrogen, methyl or phenyl and R' is hydrogen or methyl.

Surprisingly, the new O-alkyl-S-[carbamoyloxymethyl]-(thiono)thiolphosphoric(phosphonic) acid esters according to the invention display a substantially better insecticidal and acaricidal action than the known O,O-dialkyl-S-[N-monoalkylcarbamoylmethyl]-(thiono)thiolphosphoric acid esters of analogous structure and similar type of action. The products according to the invention thus represent a genuine enrichment of the art.

The invention also provides a process for the production of an O-alkyl-S-[carbamoyloxymethyl]-(thiono)thiolphosphoric(phosphonic) acid ester according to the invention in which an O-alkyl-(thiono)thiolphosphoric(phosphonic)acid of the general formula

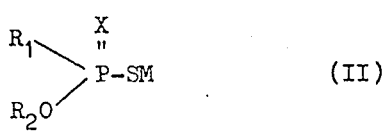

in which
R$_1$, R$_2$ and X have the abovementioned meanings and
M is alkali metal, alkaline earth metal or optionally alkyl-substituted ammonium,
is reacted with a carbamic acid monohalogenomethyl ester of the general formula

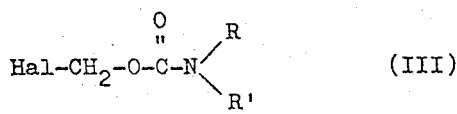

in which
R and R' have the abovementioned meanings and
Hal is halogen, preferably chlorine or bromine.

If, for example, the sodium salt of O,O-diethylthionothiolphosphoric acid and N-methyl-carbamic acid monochloromethyl ester are used as starting substances, the course of the reaction can be represented by the following formula scheme:

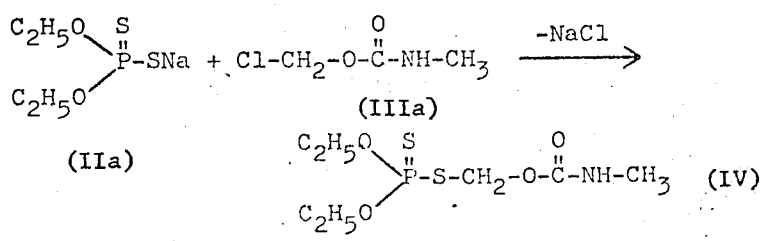

As examples of starting materials (II) which can be used, the following may be mentioned: the potassium, sodium or ammonium salts of O,O-dimethyl-, O,O-diethyl-, O,O-dipropyl-, O,O-diiso-propyl- and O-propyl-O-butyl-thiolphosphoric acid and their thiono analogues, and O-methyl-, O-ethyl-, O-propyl-, O-iso-propyl-, O-n-butyl-, O-iso-butyl-, O-sec.-butyl- and O-tert.-butyl-methane, or -ethane- or -benzene-phosphonic acid and the corresponding thiono analogues.

Examples of carbamic acid esters to be used as the starting materials (III) are: N-methyl-, N-ethyl-, N-propyl-, N-iso-propyl-, N-phenyl-, N,N-dimethyl-, N,N-diethyl- and N,N-dipropyl-carbamic acid monochloromethyl or monobromomethyl esters. Such compounds are obtainable easily and with good yields even on an industrial scale. They are manufactured, for example, by chlorination of chloroformic acid methyl ester in accordance with methods known from the literature (compare Hentschel, J. prakt. Chem. (2) 36, 213 [1887]) followed by reaction of the chloroformic acid monochloromethyl ester obtained with ammonia or the primary or secondary amine concerned.

The reaction according to the invention may be carried out in the presence of an inert solvent which term includes a mere diluent. Possible solvents include practically all inert organic solvents. These in particular include aliphatic and aromatic optionally chlorinated hydrocarbons, such as benzene, toluene, xylene, benzine, methylene chloride, chloroform, carbon tetrachloride and chlorobenzene; ethers, such as diethyl ether and dibutyl ether; ketones, such as acetone, methyl ethyl ketone, methyl isopropyl ketone and methyl isobutyl ketone; and alcohols such as iso-propanol and others. Nitriles, such as acetonitrile and propionitrile, have proved particularly suitable.

The reaction temperatures can be varied within a wide range. In general the reaction is carried out at about 0° to 100°C, preferably at about 0° to 70°C.

In general the reaction is carried out at normal pressure.

In carrying out the process, the compounds of the formula (II) and the carbamic acid monohalogenomethyl esters (III) are generally employed in equimolar ratios. An excess of one or other reactant does not appear to provide any important advantages. The reaction is preferably carried out in one of the abovementioned solvents at 0° to 70°C. Appropriately, the reaction solution is subsequently stirred for some hours and is then worked up in accordance with customary methods.

The substances according to the invention are in most cases obtained in the form of colorless to pale yellow-colored, viscous, water-insoluble oils which cannot be distilled without decomposition but can be freed from residues of volatile material, by so-called "slight distillation," that is to say prolonged heating to moderately elevated temperatures under reduced pressure, and can in this way be purified.

The refractive index is particularly used for characterizing the compounds.

As has already been mentioned, the new compounds according to the invention are distinguished by excellent insecticidal and acaricidal properties. They possess a good activity both against sucking insects and against biting insects, diptera and mites, and a systemic and soil-insecticidal action. In part, a nematocidal and rodenticidal power is also found. The products are therefore successfully employed against the most diverse animal pests, in plant protection and the protection of stored products, and in the hygiene field.

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the current gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Manestra brassicae*) and the cutworm (*Agrotis segetum*), the large white butterfly (*Pieris brassicae*), the small winter moth (*Chemimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (Bruchidius = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach *Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (Tetranychidae) such as the two-spotted spider mite (*Tetranychus urticae*) and the European red mite (*Paratetranychus pilosus = Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the new compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g., about 20–100% by weight of the active compound.

Furthermore, the present invention contemplates methods of selectively killing, combating or controlling pests, e.g., insects and acarids, which comprises applying to at least one of correspondingly (a) such insects, (b) such acarids, and (c) the corresponding habitat thereof, i.e., the locus to be protected, a correspondingly combative or toxic amount, i.e., an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Plutella test
    Solvent: 3 parts by weight of acetone
    Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration. Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage; 100% means that all the caterpillars were killed whereas 0% means that none of the caterpillars were killed.

The active compounds, the concentrations of the active compounds, the evaluation times and the results can be seen from the following Table 1.

Table 1

(Plutella test)

| Active compounds | Active compound concentration in % by weight | Degree of destruction in % after 3 days |
|---|---|---|
| $(C_2H_5O)_2P(=O)-S-CH_2-C(=O)-NH-CH_3$ (known) (A) | 0.1<br>0.01 | 50<br>0 |
| $(C_2H_5O)_2P(=S)-S-CH_2-O-C(=O)-NH_2$ (8) | 0.1<br>0.01 | 100<br>70 |
| $(C_2H_5O)(C_2H_5)P(=S)-S-CH_2-O-C(=O)-NH_2$ (9) | 0.1<br>0.01 | 100<br>100 |
| $(C_2H_5O)(C_6H_5)P(=S)-S-CH_2-O-C(=O)-NH-CH_3$ (7) | 0.1<br>0.01 | 100<br>80 |
| $(CH_3O)_2P(=S)-S-CH_2-O-C(=O)-NH-CH_3$ (4) | 0.1<br>0.01 | 100<br>70 |
| $(C_2H_5O)(C_2H_5)P(=S)-S-CH_2-O-C(=O)-NH-CH_3$ (3) | 0.1<br>0.01 | 100<br>100 |
| $(C_2H_5O)(C_2H_5)P(=O)-S-CH_2-O-C(=O)-NH-CH_3$ (6) | 0.1<br>0.01 | 100<br>100 |

Table 1 (continued)

(Plutella test)

| Active compounds | | Active compound concentration in % by weight | Degree of destruction in % after 3 days |
|---|---|---|---|
| $\begin{array}{c}C_2H_5O\\ \phantom{C_2H_5O}\diagdown\overset{O}{\underset{\|}{P}}-S-CH_2-O-\overset{O}{\underset{\|}{C}}-N\diagup\overset{CH_3}{\diagdown CH_3}\\ C_2H_5O\diagup\end{array}$ | (13) | 0.1<br>0.01 | 100<br>90 |
| $\begin{array}{c}C_2H_5O\\ \phantom{C_2H_5}\diagdown\overset{S}{\underset{\|}{P}}-S-CH_2-O-\overset{O}{\underset{\|}{C}}-N\diagup\overset{CH_3}{\diagdown CH_3}\\ C_2H_5\diagup\end{array}$ | (14) | 0.1<br>0.01 | 100<br>100 |

EXAMPLE 2

Mysus test (contact action)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 2.

Table 2

(Myzus test)

| Active compounds | | Active compound concentration in % by weight | Degree of destruction in % after 1 day |
|---|---|---|---|
| $\begin{array}{c}C_2H_5O\\ \phantom{C_2H_5}\diagdown\overset{S}{\underset{\|}{P}}-S-CH_2-\overset{O}{\underset{\|}{C}}-\underset{\underset{CH_3}{\|}}{N}-\overset{O}{\underset{\|}{C}}-OC_2H_5\\ C_2H_5O\diagup\end{array}$ (known) (B) | | 0.1<br>0.01<br>0.001 | 100<br>60<br>0 |
| $\begin{array}{c}C_2H_5O\\ \phantom{C_2H_5O}\diagdown\overset{S}{\underset{\|}{P}}-S-CH_2-O-\overset{O}{\underset{\|}{C}}-NH_2\\ C_2H_5\diagup\end{array}$ | (9) | 0.1<br>0.01<br>0.001 | 100<br>100<br>98 |

Table 2 (continued)
(Myzus test)

| Active compounds | | Active compound concentration in % by weight | Degree of destruction in % after 1 day |
|---|---|---|---|
| 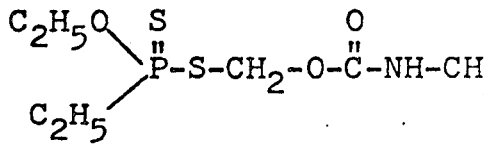 | (3) | 0.1<br>0.01<br>0.001 | 100<br>100<br>80 |
| 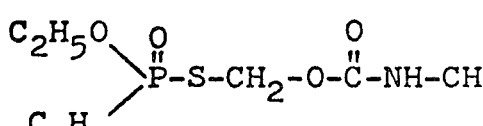 | (6) | 0.1<br>0.01<br>0.001 | 100<br>100<br>60 |
| 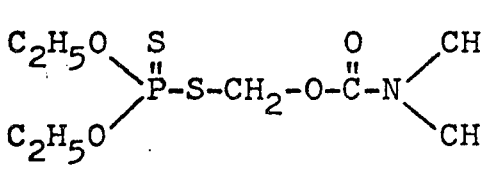 | (12) | 0.1<br>0.01<br>0.001 | 100<br>98<br>45 |
| 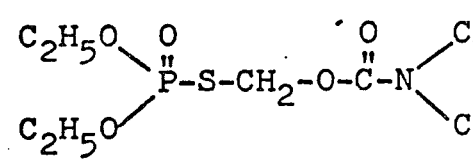 | (13) | 0.1<br>0.01<br>0.001 | 100<br>100<br>50 |
| 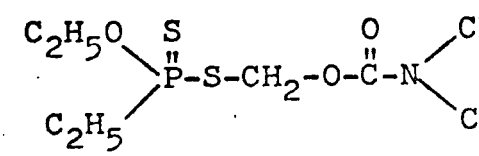 | (14) | 0.1<br>0.01<br>0.001<br>0.0001 | 100<br>100<br>95<br>50 |

EXAMPLE 3

Doralis test (systemic action)
 Solvent: 3 parts by weight of acetone
 Emulsifier: 1 part by weight of alkylaryl polyglycol ether To manufacture an appropriate preparation of active compound, 1 part by weight of active compound was mixed with the stated amount of solvent which contained the stated amount of emulsifier, and the concentrate was diluted to the desired concentration with water.

Bean plants (*Vicia faba*) which were heavily infected by bean aphid (*Doralis fabae*) were watered with the active compound preparation so that the active compound preparation penetrated into the soil without wetting the leaves of the bean plants. The active compound was taken up from the soil by the bean plants and thus reached the infected leaves.

After the indicated times, the degree of destruction in % was determined. Here 100% denotes that all aphids had been killed and 0% denotes that no aphids had been killed.

The active compounds, active compound concentrations, evaluation times and results can be seen from the following Table 3.

Table 3

(Doralis test/systemic action)

| Active compounds | | Active compound concentration in % by weight | Degree of destruction in % after 4 days |
|---|---|---|---|
| $(C_2H_5O)_2P(S)-S-CH_2-C(O)-N(CH_3)-C(O)-OC_2H_5$ (known) | (B) | 0.1<br>0.01 | 50<br>0 |
| $(C_2H_5O)_2P(S)-S-CH_2-O-C(O)-NH_2$ | (8) | 0.1<br>0.01 | 100<br>90 |
| $(C_2H_5O)(C_2H_5)P(S)-S-CH_2-O-C(O)-NH_2$ | (9) | 0.1<br>0.01<br>0.001 | 100<br>100<br>100 |
| $(CH_3O)_2P(S)-S-CH_2-O-C(O)-NH-CH_3$ | (4) | 0.1<br>0.01 | 100<br>100 |
| $(C_2H_5O)_2P(S)-S-CH_2-O-C(O)-NH-CH_3$ | (1) | 0.1<br>0.01 | 100<br>100 |
| $(C_2H_5O)(C_2H_5)P(S)-S-CH_2-O-C(O)-NH-CH_3$ | (3) | 0.1<br>0.01<br>0.001 | 100<br>100<br>100 |
| $(C_2H_5O)_2P(O)-S-CH_2-O-C(O)-NH-CH_3$ | (2) | 0.1<br>0.01<br>0.001 | 100<br>100<br>75 |

Table 3 (continued)

(Doralis test/systemic action)

| Active compounds | | Active compound concentration in % by weight | Degree of destruction in % after 4 days |
|---|---|---|---|
| $\begin{array}{c}C_2H_5O\\\\C_2H_5\end{array}\!\!>\!\!\overset{O}{\underset{\|\|}{P}}\!-S-CH_2-O-\overset{O}{\underset{\|\|}{C}}-NH-CH_3$ | (6) | 0.1<br>0.01<br>0.001 | 100<br>100<br>100 |
| $\begin{array}{c}C_2H_5O\\\\C_2H_5O\end{array}\!\!>\!\!\overset{S}{\underset{\|\|}{P}}\!-S-CH_2-O-\overset{O}{\underset{\|\|}{C}}-N\!<\!\!\begin{array}{c}CH_3\\\\CH_3\end{array}$ | (12) | 0.1<br>0.01 | 100<br>70 |
| $\begin{array}{c}C_2H_5O\\\\C_2H_5O\end{array}\!\!>\!\!\overset{O}{\underset{\|\|}{P}}\!-S-CH_2-O-\overset{O}{\underset{\|\|}{C}}-N\!<\!\!\begin{array}{c}CH_3\\\\CH_3\end{array}$ | (13) | 0.1<br>0.01<br>0.001 | 100<br>100<br>70 |

EXAMPLE 4

Tetranychus test, resistant

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate so obtained was diluted with water to the desired concentration.

Bean plants (*Phaseolus vulgaris*), which had a height of approximately 10–30 cm., were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead mites. The degree of destruction thus obtained was expressed as a percentage: 100% means that all the spider mites were killed whereas 0% means that none of the spider mites were killed.

The active compounds, the concentrations of the active compounds, the evaluation times and the results can be seen from the following Table 4.

Table 4

(Tetranychus test)

| Active compounds | Active compound concentration in % by weight | Degree of destruction in % after 2 days |
|---|---|---|
| $\begin{array}{c}C_2H_5O\\\\C_2H_5O\end{array}\!\!>\!\!\overset{O}{\underset{\|\|}{P}}\!-S-CH_2-\overset{O}{\underset{\|\|}{C}}-NH-CH_3$<br>(known)  (A) | 0.1 | 50 |

Table 4 (continued)
(Tetranychus test)
| Active compounds | Active compound concentration in % by weight | Degree of destruction in % after 2 days |
|---|---|---|
| 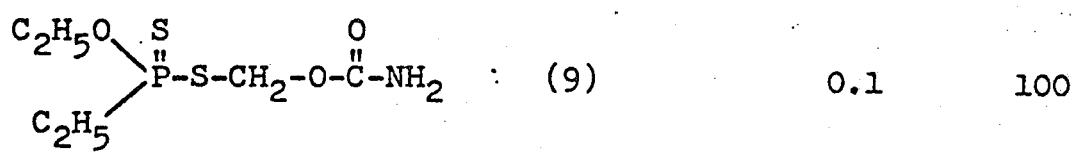 (9) | 0.1 | 100 |
| 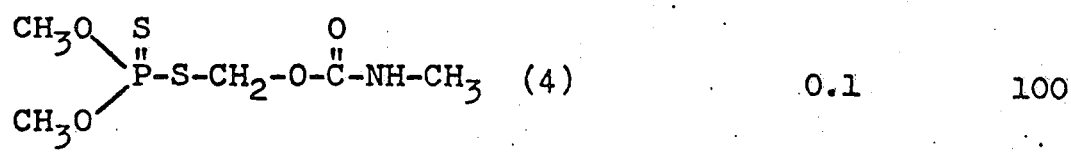 (4) | 0.1 | 100 |
| 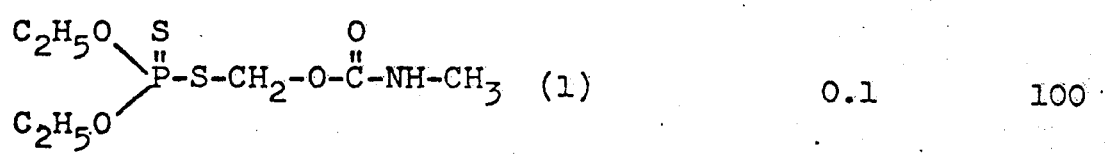 (1) | 0.1 | 100 |
| 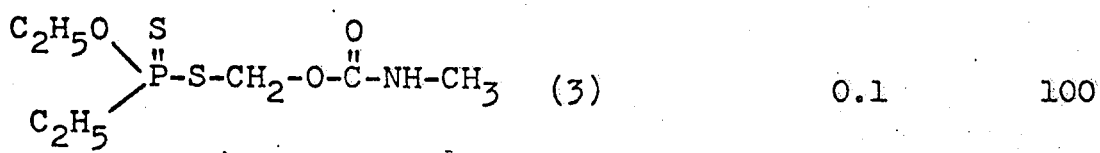 (3) | 0.1 | 100 |
| 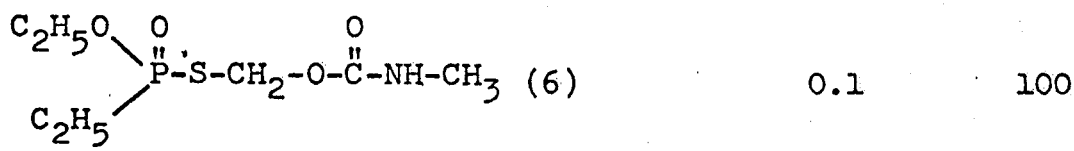 (6) | 0.1 | 100 |
| 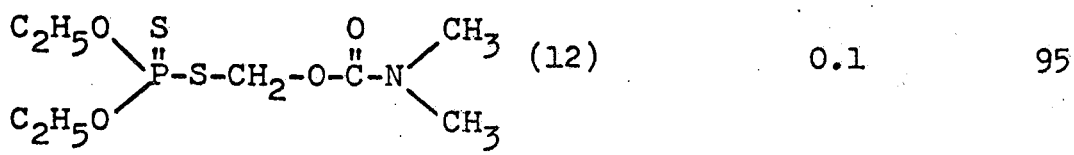 (12) | 0.1 | 95 |
| 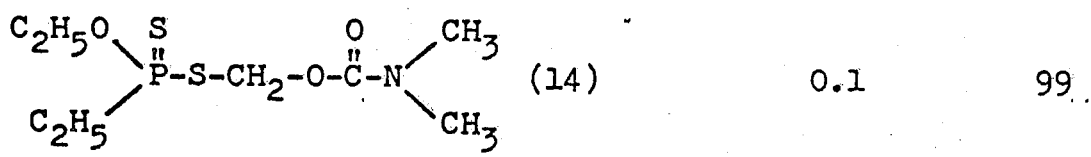 (14) | 0.1 | 99 |

EXAMPLE 5

Limiting concentration test/soil insects
Test insect: *Tenebrio molitor larvae*
Solvent: 3 parts by weight of acetone Emulsifier: 1 part by weight of alkylaryl polyglycol ether To produce an appropriate preparation of the active compound, 1 part by weight of active compound was mixed with the stated amount of solvent, the stated amount of emulsifier was added and the concentrate was diluted to the desired concentration with water. The preparation of the active compound was intimately mixed with the soil. The concentration of the active compound in the preparation was practically immaterial and the only decisive factor was the amount by weight of active compound per unit volume of soil, which is quoted in ppm (for example mg/l). The soil was filled into pots and the pots were left to stand at room temperature. After 24 hours the test insects were introduced into the treated soil and after a further 48 hours the degree of action of the active compound was determined, in %, by counting the dead and live test insects. The degree of action was 100% if all test insects had been killed and was 0% if exactly as many test insects were still alive as in the case of the control.

The active compounds, amounts used and results can be seen from the following Table 5.

Table 5

Soil insecticides (Tenebrio molitor larvae)

| Active compounds | Degree of destruction in % at an active compound concentration of | | | |
|---|---|---|---|---|
| | 40 | 20 | 10 | 5 ppm |
| $(C_2H_5O)_2 P(S)-S-CH_2-C(O)-N(CH_3)-C(O)-OC_2H_5$ (known) (B) | 100 | 50 | 0 | |
| $(C_2H_5O)_2 P(S)-S-CH_2-O-C(O)-NH-CH_3$ (1) | 100 | 100 | 90 | 50 |
| $(C_2H_5O)(C_2H_5) P(S)-S-CH_2-O-C(O)-NH-CH_3$ (3) | 100 | 100 | 90 | 50 |
| $(C_2H_5O)(C_2H_5) P(O)-S-CH_2-O-C(O)-NH-CH_3$ (6) | 100 | 95 | 90 | 50 |

EXAMPLE 6 a. The preparation of the N-methylcarbamic acid monochloromethyl ester required as the starting material took place as follows:

1 molar batch:

130 g of chloroformic acid monochloromethyl ester were dissolved in 400 ml of ethylene chloride. 65 g of methylamine — dissolved in 200 ml of ethylene chloride — were added dropwise to this solution at — 10°C, while stirring, the reaction mixture was stirred for a further hour at room temperature and the methylammonium hydrochloride which had separated out was then filtered off. Fractional distillation of the filtrate yielded 84 g (68% of theory) of N-methylcarbamic acid monochloromethyl ester of boiling point 3mm Hg:80°C.

Other carbamic acid monohohalogenomethyl esters of the general formula (III) to be used as starting substances were prepared analogously.

b)

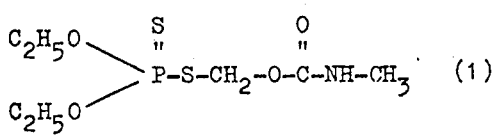

0.4 molar batch:

85 g of sodium O,O-diethylthionothiol-phosphate were dissolved in 400 ml of acetonitrile. 50 g of N-methyl-carbamic acid monochloromethyl ester were added to this solution, while stirring; thereafter the reaction mixture was additionally warmed to 60°C for 1 hour and then diluted with 400 ml of benzene, and the benzene solution was twice washed with 200 ml of ice water at a time and dried over sodium sulfate. After distilling off the solvent, 80 g (73% of theory) of the O,O-diethyl-S-[N-monomethylcarbamoyl-oxy-methyl]-thionothiolphosphoric acid ester were obtained as a water-insoluble, colorless oil of refractive index $n_D^{23}$ = 1.5145.

Calculated for a molecular weight of 273:

| | | found: | |
|---|---|---|---|
| P | 11.3%; | | 11.4%; |
| S | 23.4%; | | 23.1%; |
| N | 5.1%; | | 5.3%. |

EXAMPLE 7

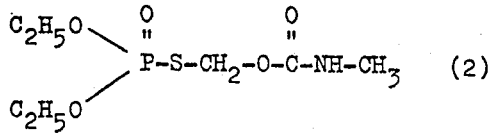

0.4 molar batch:

76 g of ammonium O,O-diethylthiol-phosphate were dissolved in 400 ml of acetonitrile. 50 g of N-methyl-carbamic acid monochloromethyl ester were added to this solution, while stirring. Thereafter the reaction mixture was additionally warmed to 60°C for 1 hour. It was then worked up as described in Example 6. 101 g (98% of theory) of O,O-diethyl-S-[N-monomethylcarbamoyl-oxy-methyl]-thiolphosphonic acid ester were obtained in the form of a colorless sparingly water-soluble oil of refractive index $n_D^{22}$ = 1.4768.

Calculated for a molecular weight of 257:

| | | found: | |
|---|---|---|---|
| P | 12.1%; | | 12.0%; |
| S | 12.4%; | | 12.2%; |
| N | 5.5%; | | 5.4%. |

EXAMPLE 8

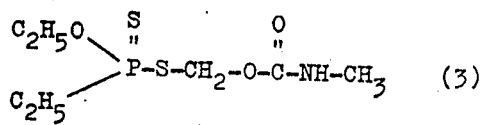

0.4 molar batch:

85 g of potassium O-ethyl-ethane-thionothiolphosphonate were dissolved in 400 ml of acetonitrile. 50 g of N-methyl-carbamic acid monochloromethyl ester were added to this solution while stirring and the mixture was additionally warmed to 60°C for 1 hour and then worked up as in Example 6. 86 g (84% of theory) of the O-ethyl-S-[N-monomethylcarbamoyloxymethyl]-ethane-thionothiolphosphonic acid ester were obtained as a colorless, water-insoluble oil of refractive index $n_D^{22}$ = 1.5330.

Calculated for a molecular weight of 257:

| | | found: | |
|---|---|---|---|
| P | 12.0%; | | 11.8%; |
| S | 24.9%; | | 24.8%; |
| N | 5.5%; | | 5.8%. |

EXAMPLE 9

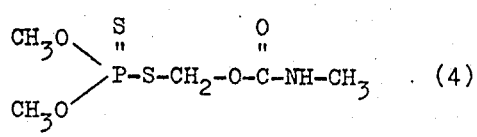

0.35 molar batch:

70 g of potassium O,O-dimethyl-thionothiolphosphate were dissolved in 350 ml of acetonitrile. 44 g of N-methyl-carbamic acid monochloromethyl ester were added to this solution at 40°C, while stirring. Thereafter the reaction mixture was additionally warmed to 70°C for 1 hour. It was then cooled to room temperature, the batch was taken up in 300 ml of methylene chloride and the methylene chloride solution was twice washed with 100 ml of water at a time and dried over sodium sulfate. After distilling off the solvent, 61 g (61% of theory) of the O,O-dimethyl-S-[N-monomethylcarbamoyl-oxy-methyl]-thionothiolphosphoric acid ester were obtained as a colorless, water-insoluble oil of refractive index $n_D^{25}$ = 1.5179.

Calculated for a molecular weight of 245:

| | | found: | |
|---|---|---|---|
| P | 12.6%; | | 12.2%; |
| S | 26.1%; | | 25.9%; |
| N | 5.7%; | | 5.9%. |

EXAMPLE 10

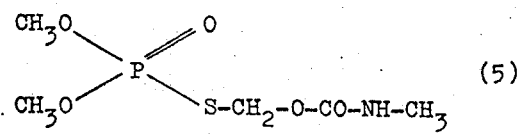

0.4 molar batch:

69 g of ammonium O,O-dimethyl-thiol-phosphate were dissolved in 400 ml of acetonitrile. 50 g of N-methyl-carbamic acid monochloromethyl ester were added to the solution while stirring. The reaction mixture was warmed to 70°C for 1 hour and then cooled to room temperature, the salt-like precipitate which had separated out was filtered off and the filtrate was fractionally distilled. 89 g (89% of theory) of the O,O-dimethyl-S-[N-monomethylcarbamoyl-oxy-methyl]-thiolphosphoric acid ester were obtained in the form of a water-soluble pale yellow oil of refractive index $n_D^{25}$ = 1.4860.

Calculated for a molecular weight of 229:

| P | 13.5%; | found | 13.3%; |
| S | 14.0%; | | 13.9%; |
| N | 6.1%; | | 6.3%. |

EXAMPLE 11

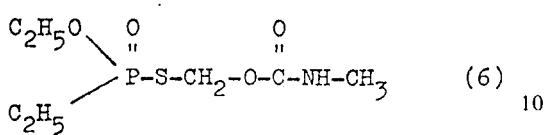

(6)

0.4 molar batch:

70 g of potassium O-ethyl-ethane-thiolphosphonate were dissolved in 400 ml of acetonitrile. 50 g of N-methyl-carbamic acid monochloromethyl ester were added to the solution while stirring, and the mixture was additionally warmed to 70°C for 1 hour and then worked up as in the example described above. 94 g (97% of theory) of the O-ethyl-S-[N-monomethylcarbamoyl-oxy-methyl]-ethane-thiolphosphonic acid ester of refractive index $n_D^{25} = 1.4927$ were thus obtained.

Calculated for a molecular weight of 241:

| P | 12.9%; | found: | 12.7%; |
| S | 13.3%; | | 13.1%; |
| N | 5.8%; | | 5.9%. |

EXAMPLE 12

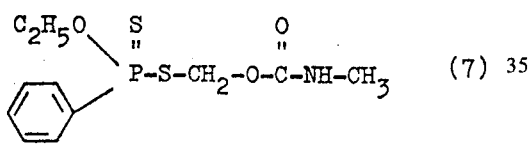

(7)

0.35 molar batch:

90 g of potassium )-ethyl-benzene-thionothiolphosphonate were dissolved in 350 ml of acetonitrile. 44g of N-methyl-carbamic acid monochloromethyl ester were added to this solution while stirring. The mixture was warmed to 70°C for 1 hour and then worked up as in Example 10. 90 g (84% of theory) of O-ethyl-S-[N-monomethylcarbamoyl-oxy-methyl]-benzene-thionothiolphosphonic acid ester were obtained as a colorless, water-insoluble oil of refractive index $n_D^{25} = 1.5653$ Calculated for a molecular weight of 305:

| P | 10.1%; | found: | 10.1%; |
| S | 21.0%; | | 20.9%; |
| N | 4.6%; | | 4.6%. |

EXAMPLE 13

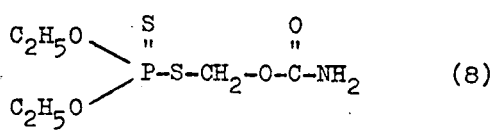

(8)

0.25 molar ratio:

53 g of sodium O,O-diethyl-thionothiolphosphate are dissolved in 250 ml of acetonitrile. 26 g of carbamic acid monochloromethyl ester (melting point 50°C) were added to the resulting solution while stirring. After warming to 70°C for 1 hour, the reaction mixture was worked up as in Example 10. 51 g (79% of theory) of O,O-diethyl-S-[carbamoyl-oxy-methyl]-thionothiolphosphoric acid ester were obtained as a water-insoluble colorless oil of refractive index $n_D^{23} = 1.5249$.

Calculated for a molecular weight of 259:

| P | 12.4%; | found: | 12.2%; |
| S | 24.7%; | | 25.0%; |
| N | 5.4%; | | 5.5%. |

EXAMPLE 14

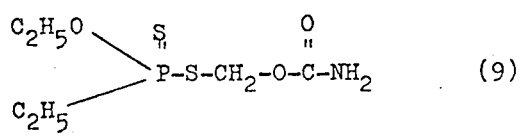

(9)

0.4 molar batch:

85 g of potassium O-ethyl-ethane-thionothiolphosphonate were dissolved in 400 ml of acetonitrile. 44 g of carbamic acid monochloromethyl ester were added to the resulting solution at 60°C, while stirring. The mixture was warmed to 70°C for 1 hour and was then worked up as in Example 10. 80 g (83% of theory) of O-ethyl-S-[carbamoyl-oxy-methyl]-ethane-thionothiolphosphonic acid ester were obtained in the form of a water-insoluble colorless oil of refractive index $n_D^{23} = 1.5470$.

Calculated for a molecular weight of 243:

| P | 12.7%; | found: | 12.3%; |
| S | 26.4%; | | 26.9%; |
| N | 5.8%; | | 6.0%. |

EXAMPLE 15

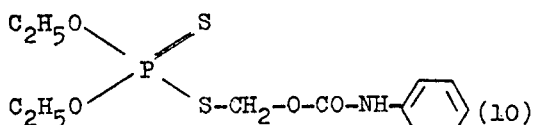

(10)

0.3 molar batch:

65 g of sodium O,O-diethyl-thionothiolphosphate were dissolved in 300 ml of acetonitrile. 56 g of N-phenyl-carbamic acid monochloromethyl ester (melting point 77°C) were added to this solution, while stirring. After warming to 70°C for 1 hour, the batch was worked up in the manner described in Example 10. 65 g (65% of theory) of O,O-diethyl-S-[N-phenyl-carbamoyl-oxy-methyl]-thionothiolphosphoric acid ester were obtained as a colorless, water-insoluble oil of refractive index $n_D^{23} = 1.5672$.

Calculated for a molecular weight of 335:

| P | 9.2%; | found: | 9.2%; |
| S | 19.2%; | | 19.3%; |
| N | 4.2%; | | 4.4%. |

EXAMPLE 16

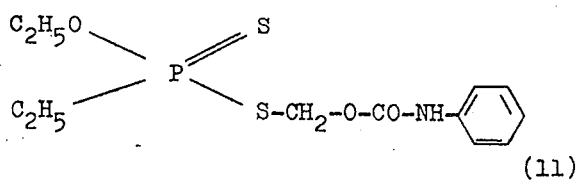

(11)

0.3 molar batch:

65 g of potassium O-ethyl-ethane-thionothiolphosphonate were dissolved in 300 ml of acetonitrile. 56 g of N-phenyl-carbamic acid monochloromethyl ester (melting point 77°C) were added to this solution, while stirring. After warming to 70°C for 1 hour, the mixture was worked up as described in Example 10. 72 g (72% of theory) of O-ethyl-S-[N-phenylcarbamoyl-oxy-methyl]-ethane-thionothiolphosphonic acid ester were obtained in the form of a colorless, water-insoluble oil of refractive index $n_D^{25} = 1.5792$.

Calculated for a molecular weight of 319:

| P | 9.7%;  | found | 9.9%; |
|---|--------|-------|-------|
| S | 20.2%; |       | 19.9%; |
| N | 4.4%;  |       | 4.6%. |

EXAMPLE 17

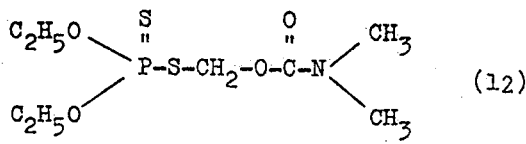

(12)

0.4 molar batch:

85 g of sodium O,O-diethyl-thionothiolphosphate were dissolved in 400 ml of acetonitrile. 56 g of N,N-dimethyl-carbamic acid monochloromethyl ester (boiling point, 1mm Hg: 46°C) were added to this solution, while stirring. Thereafter the reaction mixture was warmed to 60°C for 1 hour. The batch was then cooled to room temperature and taken up in 300 ml of benzene. The benzene solution was twice washed with 100 ml of ice water at a time and was subsequently dried over sodium sulfate. After distilling off the solvent, 74 g (64% of theory) of O,O-diethyl-S-[N,N-dimethylcarbamoyl-oxy-methyl]-thionothiolphosphoric acid ester were obtained in the form of a colorless, water-insoluble oil of refractive index $n_D^{25} = 1.5127$.

Calculated for a molecular weight of 287:

| P | 10.8%;  | found: | 11.1%; |
|---|---------|--------|--------|
| S | 22.3%;  |        | 22.3%; |
| N | 4.87%;  |        | 4.6%.  |

EXAMPLE 18

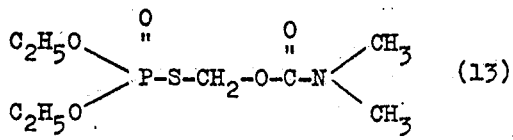

(13)

0.4 molar batch:

77 g of ammonium O,O-diethyl-thiolphosphate were dissolved in 400 ml of acetonitrile. 56 g of N,N-dimethyl-carbamic acid monochloromethyl ester were added to the resulting solution, while stirring. The reaction mixture was subsequently warmed to 65°C for 1 hour and was then worked up as in Example 17. 75 g (69% of theory) of O,O-diethyl-S-[N,N-dimethylcarbamoyl-oxy-methyl]-thiolphosphoric acid ester were obtained as a sparingly water-soluble, colorless oil of refractive index $n_D^{23} = 1.4747$.

Calculated for a molecular weight of 271:

| P | 11.4%;  | found | 11.2%; |
|---|---------|-------|--------|
| S | 11.8%;  |       | 12.1%; |
| N | 5.17%;  |       | 5.0%.  |

EXAMPLE 19

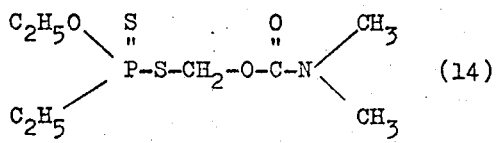

(14)

0.4 molar batch:

85 g of potassium O-ethyl-ethane-thionothiolphosphonate were dissolved in 400 ml of acetonitrile. 56 g of N,N-dimethyl-carbamic acid monochloromethyl ester were added to this solution, while stirring. The reaction mixture was subsequently warmed to 65°C for 1 hour and was then worked up as in Example 17. 78 g (75% of theory) of O-ethyl-S-[N,N-dimethylcarbamoyl-oxy-methyl]-ethane-thionothiolphosphonic acid ester were obtained in the form of a water-insoluble, pale yellow oil of refractive index $n_D^{25} = 1.5271$.

| P | 11.4%;  | found | 11.6%; |
|---|---------|-------|--------|
| S | 23.6%;  |       | 23.5%  |
| N | 5.17%   |       | 5.0%.  |

It will be appreciated that the instant specification and examples are set forth by way of illustration and not limitation and that various modifications and changes may be made without departing from the spirit and scope of the present invention.

What is claimed is:

1. An O-alkyl-S-[carbamoyloxymethyl]-(thiono)thiolphosphoric (phosphonic) acid ester of the formula

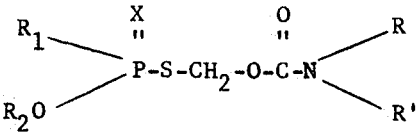

in which
 $R_1$ is lower alkyl, lower alkoxy or phenyl,
 $R_2$ is lower alkyl,
 R is hydrogen, alkyl or phenyl,
 R' is hydrogen or alkyl with 1 to 3 carbon atoms, and
 X is oxygen or sulfur.

2. A compound according to claim 1 in which $R_1$ is alkyl or alkoxy with 1–3 carbon atoms, $R_2$ is alkyl with 1 to 3 carbon atoms, R is hydrogen, methyl or phenyl, and R' is hydrogen or methyl.

3. The compound according to claim 1 wherein such compound is O-ethyl-S-[N-monomethylcarbamoyl-oxy-methyl]-ethane-thionothiolphosphonic acid ester of the formula

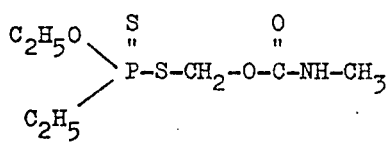

4. The compound according to claim 1 wherein such compound is O,O-dimethyl-S-[N-monomethylcarbamoyl-oxymethyl]-thionothiolphosphoric acid ester of the formula

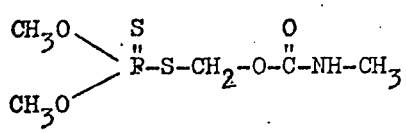

5. The compound according to claim 1 wherein such compound is O-ethyl-S-[N-monomethylcarbamoyl-oxy-methyl]-ethane-thiolphosphonic acid ester of the formula

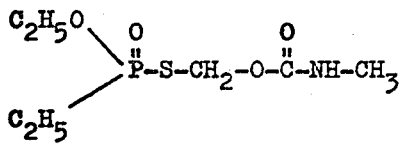

6. The compound according to claim 1 wherein such compound is O-ethyl-S-[carbamoyl-oxy-methyl]-ethane-thionothiolphosphonic acid ester of the formula

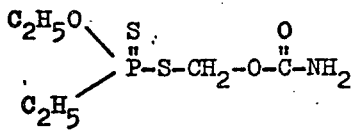

7. The compound according to claim 1 wherein such compound is O,O-diethyl-S-[N,N-dimethylcarbamoyl-oxy-methyl]-thiolphosphoric acid ester of the formula

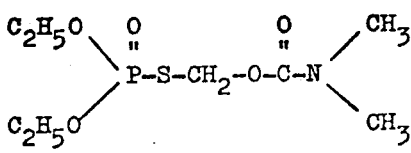

* * * * *